United States Patent
Dickerson et al.

(10) Patent No.: US 6,186,292 B1
(45) Date of Patent: Feb. 13, 2001

(54) METHOD OF IMPROVING ROTOR VIBRATION CONTROL AND RESULTING ROTOR

(75) Inventors: Weston E. Dickerson, Milford; Charles E. Burger, Farmington, both of MI (US)

(73) Assignee: Hayes Lemmerz International, Inc., Northville, MI (US)

( * ) Notice: Under 35 U.S.C. 154(b), the term of this patent shall be extended for 0 days.

(21) Appl. No.: 09/064,245

(22) Filed: Apr. 22, 1998

Related U.S. Application Data

(60) Provisional application No. 60/069,008, filed on Dec. 10, 1997.

(51) Int. Cl.$^7$ .................................................. F16D 65/10
(52) U.S. Cl. ............................ 188/218 XL; 188/264 AA
(58) Field of Search ..................... 188/218 XL, 218 R, 188/17, 18 A, 26, 264 A, 264 AA

(56) References Cited

U.S. PATENT DOCUMENTS

| | | |
|---|---|---|
| 3,661,235 * | 5/1972 | Harrison .......................... 188/218 XL |
| 4,379,501 | 4/1983 | Hagiwara et al. . |
| 4,469,203 * | 9/1984 | Herbulot et al. ................ 188/218 XL |
| 4,523,666 | 6/1985 | Murray . |
| 4,705,146 * | 11/1987 | Tarter ................................ 188/73.1 |
| 4,867,284 | 9/1989 | Okamura et al. . |
| 5,238,089 | 8/1993 | Matsuzaki et al. . |
| 5,492,205 | 2/1996 | Zhang . |

* cited by examiner

Primary Examiner—Robert J. Oberleitner
Assistant Examiner—Pamela J. Lipka
(74) Attorney, Agent, or Firm—Marshall & Melhorn

(57) ABSTRACT

The noise created by a vehicle rotor is reduced by adjusting the natural or resonant frequency at which the rotor tends to vibrate. The resonant frequency is moved away from the frequencies of excitation of such sources as the brake pads and vehicle drive train components. The resonant frequency of the rotor is adjusted by manipulating the geometry and mass of the rotor by adjusting the number, size, shape, spacing and location of cooling vents formed in the hat section of the rotor. The resulting rotor exhibits improved vibrational control.

3 Claims, 1 Drawing Sheet

METHOD OF IMPROVING ROTOR VIBRATION CONTROL AND RESULTING ROTOR

RELATED APPLICATION

This application is claiming the benefit, under 35 USC §119(e), of the provisional application filed Dec. 10, 1997 under 35 USC § 111(b), which was granted a serial number of 60/069,008. The provisional application, Ser. No. 60/069,008, is hereby incorporated by reference in its entirety.

BACKGROUND OF INVENTION

The present invention relates to a method of reducing the noise of a vehicle brake rotor and specifically for manipulating the rotor hat cross vents to tune the resonant frequency of the rotor.

Wheeled vehicles are typically slowed and stopped with a braking system that generates frictional forces. Many braking systems include a rotor attached to one or more of the vehicle wheels for rotation therewith, and a caliper assembly secured to a non-rotating component of the vehicle, such as the vehicle frame. A typical rotor includes an annular peripheral section having friction surfaces disposed on opposite sides and a central hat section having fasteners for securing the wheel thereto. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheel and slow or stop the vehicle.

The frictional braking forces generate heat which is absorbed by the rotor, increasing the temperature of the rotor. It is important to dissipate the heat and cool the rotor, because excessive rotor temperatures reduce braking performance, creating longer stopping distances, shortening the life of the rotor, or even causing brake failure. Rotors are commonly cooled using moving air which absorbs the heat from the rotor and carries it away. It is known to "ventilate" the rotors by forming holes or vents through the friction surfaces or the hat section of the rotor. As the rotor turns, air is moved through the vents. The moving air absorbs heat and cools the rotor.

During braking, the brake pads excite the rotor when contacting the friction surfaces, causing the rotor to vibrate. The rotor is excited by other stimuli, such as the vehicle drive train components, which also transmit energy to the rotor causing it vibrate. The vibrating rotor creates undesirable noise by transmitting the vibrations to vehicle occupants through the surrounding air or through the structure of the vehicle. The rotor may also excite other components, causing them to vibrate and emit undesirable noise. It is desirable to reduce vibrations of the rotor or change the frequency of these vibrations in order to reduce undesirable noise from the rotor and adjacent vehicle components.

SUMMARY OF INVENTION

This invention relates to a method of reducing the noise created by a vehicle rotor by adjusting the natural or resonant frequency at which the rotor tends to vibrate, and to the resulting rotor. The resonant frequency is moved away from the frequencies of excitation of such sources as the brake pads and vehicle drive train components. The resonant frequency of the rotor is adjusted by manipulating the geometry and mass of the rotor by adjusting the number, size, shape, spacing and location of cooling vents formed in the hat section of the rotor.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENTS

Figure 1:
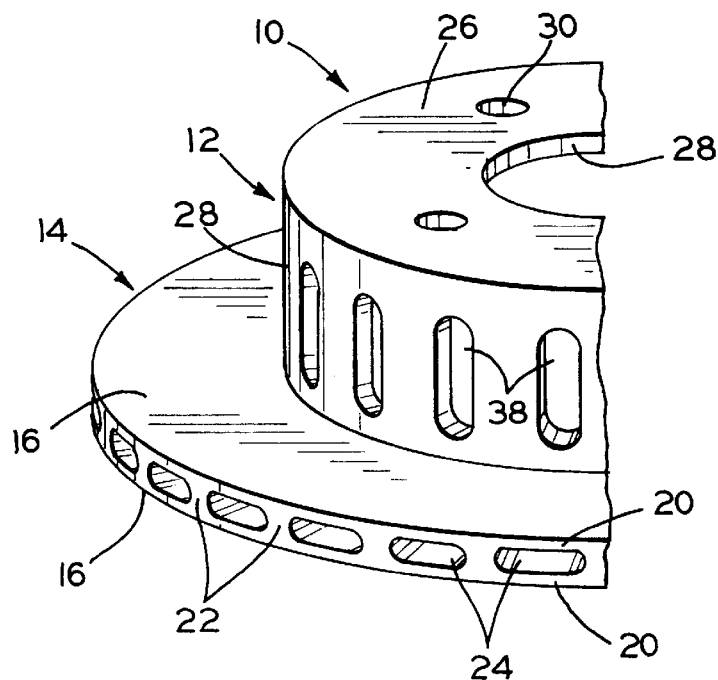
FIG. 1 is a perspective view of a portion of a brake rotor having hat section cross vents in accordance with the invention.

Referring now to the drawings, there is illustrated in FIG. 1 a portion of a brake rotor, indicated generally at 10, constructed in accordance with the present invention. The rotor 10 includes a central hub or hat section 12 and a peripheral ring-shaped friction section 14. The peripheral friction section 14 extends radially outwardly from the hat section 12. Flat annular friction surfaces 16 are located on opposite sides of the friction section 14. The friction surfaces 16 are adapted to interface with associated friction members (not shown), such as brake pads or the like, during braking to generate friction forces which stop or slow the vehicle.

Figure 2:
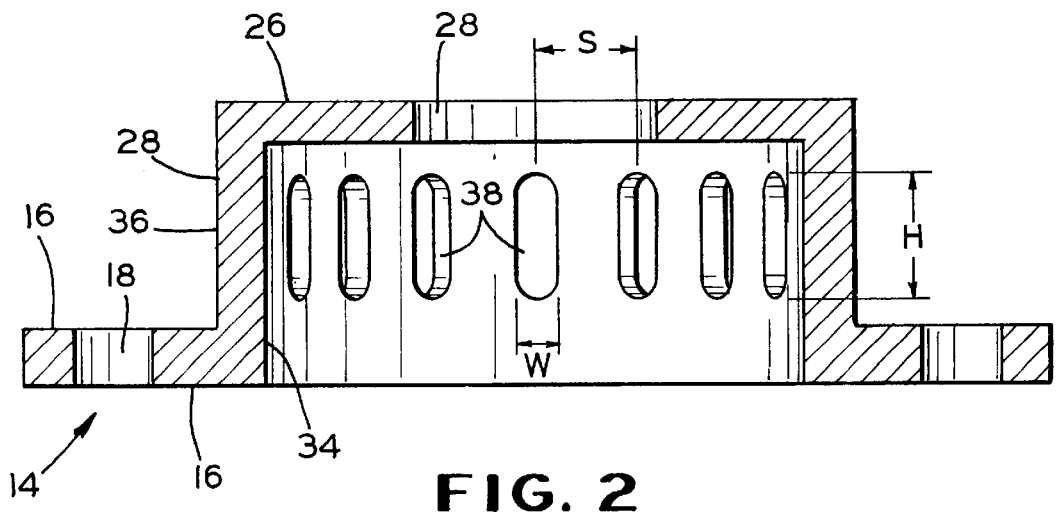
FIG. 2 is a sectional view of a brake rotor having hat section cross vents in accordance with the invention and having alternate friction section venting.

Referring to FIG. 2, holes or cross vents 18 are formed through the friction surfaces 16 to "ventilate" the rotors for cooling. As the rotor turns, air is moved through the cross vents 18 which absorbs heat from the rotor friction surfaces 16 and carries it away. An alternative vented friction surface is shown in FIG. 1, which includes friction surfaces 16 formed on a pair of annular friction plates 20 joined together by spacers or posts 22 in a mutually parallel, spaced apart relationship to form spaces or vents 24 therebetween. The 24 vents are open at the radially inner and outer edges of the friction plates 20 to form air passages between the friction plates. As the vented rotor turns, air is forced through the vents between the friction plates 20 surfaces which absorbs heat from the friction surfaces and cools the rotor 10.

The hat section 12 includes a mounting face 26 for mounting the rotor 10 on an associated drive member (not shown), such as a spindle or vehicle axle. The mounting face 26 is provided with a central pilot aperture 28 in which a spindle hub or the like (not shown) may be closely received. Also provided are a plurality of circumferentially spaced apart fastener apertures 30 in which fasteners (also not shown) may be received to mount the rotor 10 on an associated drive member in the conventional manner.

The hat section 12 also includes a cylindrical shoulder or hat wall 32 extending axially from the periphery of the mounting face 26 to the peripheral friction section 14. The hat wall 32 includes a radially inner surface 34 and a radially outer surface 36. Holes are formed through the hat wall 32 extending from the inner surface 34 to the outer surface 36 of the hat wall to form hat section cross vents 38. The cross vents 38 move air through the hat section 12 and over other portions of the rotor 10 to cool the rotor in a similar manner as described above.

As also described above, energy is supplied to the rotor by various stimuli, called exciters, which cause the rotor to vibrate. The vibrating rotor creates undesirable noise by transmitting the vibrations to vehicle occupants through the surrounding air or through the structure of the vehicle. The rotor has a natural or resonant frequency $f_r$ at which it tends to vibrate the most when provided with a predetermined amount of energy by an exciter. Many exciters impart energy to the rotor having amplitude peaks at particular frequencies $f_e$ such that they tend to cause the rotor to vibrate the most at these frequencies. If the rotor's resonant frequency $f_r$ coincides with the peak excitation frequencies $f_e$, the rotor vibrations will be maximized, as will the rotor noise. It is desirable to move the resonant frequency of the rotor away from the amplitude peaks of the exciters to reduce the rotor noise.

The rotor resonant frequency $f_r$ is determined by many inflexible variables including the shape of the rotor, the rotor material, and the material thickness. These variables cannot be changed much because they are constrained by design parameters of the rotor and therefore, offer little flexibility for adjustment of the rotor's resonant frequency $f_r$.

It has been found that the hat section cross vents 38 also significantly affect the resonant frequency $f_r$ of the rotor 10. Thus, changing the cross vents 38 changes the mass and geometry of the rotor, which in turn affects the resonant frequency $f_r$. The number and location of the hat section cross vents 38, and the size, shape, and spacing of such vents, all contribute in determining the rotor's resonant frequency. It has further been determined that the configuration of the cross vents 38 is independent of the configuration of the friction surface vents (18 or 24), which allows flexibility in adjusting the cross vent parameters to obtain the desired rotor resonant frequency $f_r$. The friction surface vents (18 or 24) are optional, and may or may not be formed in the rotor of the invention.

The shape of the cross vents 38 may be round, oval, or any suitable shape. The size of the cross vents is defined by a maximum width W and a maximum height H. The spacing between the cross vents is defined by a distance S. The size and shape of each vent can be varied in addition to the height H, width W, or distance S of each vent to achieve the desired resonant frequency $f_r$.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

We claim:

1. A method of adjusting the resonant frequency of a brake rotor relative to the frequency $f_e$ of the amplitude peak of the energy imparted to the rotor by a brake pad comprising:

providing a brake rotor including a hat section having a hat wall, wherein the rotor has a resonant frequency $f_{r1}$ at which the rotor tends to vibrate the most when provided with a predetermined amount of energy by a brake pad;

providing a brake pad for interfacing with the rotor during braking;

determining the frequency $f_e$ of the amplitude peak of the energy imparted to the rotor by the brake pad during braking; and forming a predefined number of cross vents in the hat section wall having predefined shapes, sizes, spacings and locations, wherein said number, shapes, sizes, spacings and locations of said cross vents are adjusted so that the rotor with vented hat section has a resonant frequency of $f_{r2}$ such that $|f_{r1}-f_e|<|f_{r2}-f_e|$.

2. A brake rotor produced according to the method of claim 1.

3. A brake rotor adapted to receive energy from a brake pad with an amplitude peak at a frequency $f_e$, the brake rotor comprising:

a central hat section including a hat wall, said hat wall having a plurality of cross vents extending therethrough; and an annular friction section extending from said hat section;

wherein the rotor without cross vents has a resonant frequency $f_{r1}$ at which the rotor tends to vibrate the most when provided with a predetermined amount of energy by a brake pad and the number, shapes, sizes, spacings and locations of said cross vents are selected so that the rotor with cross vents has a resonant frequency $f_{r2}$ at which the rotor tends to vibrate the most when provided with a predetermined amount of energy by a brake pad having an amplitude peak of $f_e$, and $|f_{r1}-f_e|<|f_{r2}-f_e|$.

\* \* \* \* \*